Jan. 10, 1961 J. F. MARCHAND 2,967,950
MAGNETIC FREQUENCY DIVIDER CIRCUIT ARRANGEMENT
Filed June 18, 1958
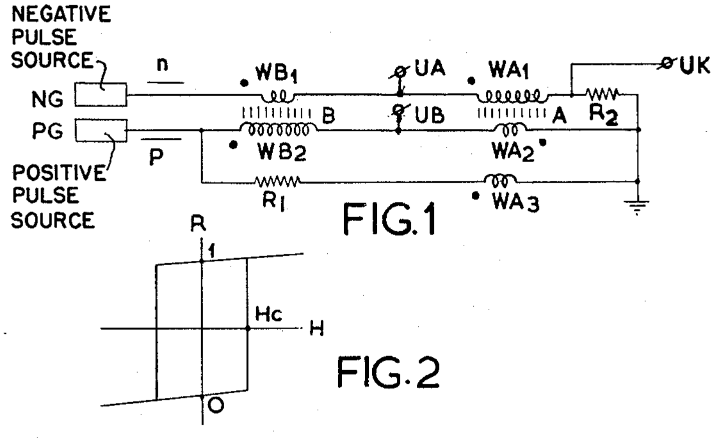
FIG.1 FIG.2
| | | p | | n | | p | | n | | p |
|---|---|---|---|---|---|---|---|---|---|---|
| A | 0 | | 1 | | 0 | | 0 | | 0 | |
| B | 0 | | 1 | | 1 | | 1 | | 0 | |
FIG.3
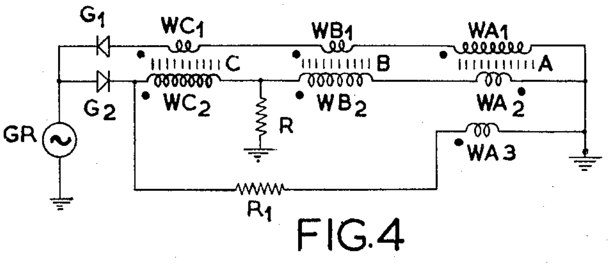
FIG.4
| | | p | | n | | p | | n | | p | | n | | p |
|---|---|---|---|---|---|---|---|---|---|---|---|---|---|---|
| A | 0 | | 1 | | 0 | | 1 | | 0 | | 0 | | 0 | |
| B | 0 | | 0 | | 0 | | 1 | | 1 | | 1 | | 0 | |
| C | 0 | | 1 | | 1 | | 1 | | 1 | | 1 | | 0 | |
FIG.5
INVENTOR
JEAN FRANÇOIS MARCHAND
BY
Frank R. Jifoni
AGENT 2,967,950

Patented Jan. 10, 1961

2,967,950

MAGNETIC FREQUENCY DIVIDER CIRCUIT ARRANGEMENT

Jean François Marchand, Eindhoven, Netherlands, assignor to North American Philips Company, Inc., New York, N.Y., a corporation of Delaware Filed June 18, 1958, Ser. No. 742,942

Claims priority, application Netherlands July 12, 1957

2 Claims. (Cl. 307—88)

This invention relates to magnetic frequency division circuit arrangements.

Such arrangements are used, for example, in binary or decimal counting circuits in electronic computers or in automatic signalling systems.

A magnetic frequency division circuit arrangement is known comprising a first and a second core of magnetic material having a rectangular hysteresis loop, which cores are provided with two series-connected first windings and two second windings connected in series opposition while the first core is also provided with a third winding, pulses of given polarity being supplied to the series-connected windings and pulses of opposite polarity being applied to the said third winding, the magnetic action of these latter pulses on the first core being opposed to that of the former pulses.

It is an object of the present invention to provide a simplified circuit arrangement of the above-mentioned kind so that a rectifier can be dispensed with. In the magnetic frequency division circuit arrangement in accordance with the invention the first winding on the first core has a greater number of turns than the first winding on the second core and the second winding of the first core has less turns than the second winding of the second core, the pulses of opposite polarity being applied to the second windings connected in series opposition as well as to a third winding. The magnetic action of these pulses on the first core is opposite to that due to the pulses through the first winding.

In order that the invention may readily be carried out, two embodiments thereof will now be described, by way of example, with reference to the accompanying drawings, in which Figs. 1 and 4 show a first and a second embodiment respectively, Fig. 2 shows, by way of example, a magnetization curve, and Figs. 3 and 5 are tables which illustrate the operation of the arrangements shown in Figs. 1 and 4.

The binary frequency divider shown in Fig. 1 contains two cores A and B made of a magnetic material having a rectangular hysteresis loop such as is shown in idealized form in Fig. 2.

Windings WA1 and WB1 are connected in series to a source NG of negative pulses $n$. Windings WA2 and WB2 are connected in series opposition to a source PG of positive pulses $p$ which also, through a resistor R1, supplies pulses to a winding WA3 on the core A. With respect to time, these pulses fall between the negative pulses $n$. By means of a delay network the pulses $n$ may be derived from the pulses from the source PG or conversely, thus dispensing with one of the sources. The number of turns of the windings WA1 and WB2 is greater than that of the windings WB1 and WA2 respectively. Both cores A and B may be in two different remanence conditions 1 and 0 as indicated in Fig. 2. The dots shown adjacent the windings denote in known manner the ends of the windings to which the positive current must be supplied in order to bring the cores into the condition 1. This circuit arrangement operates as follows:

It is assumed that at a certain instant both cores are in the condition 0. The next positive pulse $p$ causes the core B to pass to the condition 1 owing to the current flowing through the windings WB2 and WA2. Since this produces a comparatively large variation in the magnetic induction of the core B, the winding WB2 has a comparatively high inductance so that the current in this circuit is limited to a low value. The core A also passes to the condition 1 because the current flowing through the resistor R1 and the winding WA3 is counter-acted only slightly by the current through the winding WA2. The next negative pulse $n$ restores the core A to the condition 0 by means of the current through windings WA1 and WB1. This gives rise to a comparatively large change of the magnetic induction in the core A so that the winding WA1 has a high inductance and the current passing through the winding WB1 is limited to so low a value that the field strength H in the core B remains below the critical value H$c$. At the next positive pulse $p$ the cores A and B remain in the conditions 0 and 1 respectively, for the direction of the pulse $p$ is such that the core B is driven further into the saturation condition 1 so that the winding WB2 has a low inductance and the current passing through the winding WA2 counteracts the pulse in the winding WA3 to an extent such that this pulse cannot cause the core A to change its condition. The next negative pulse $n$ restores the core B to the condition 0. By this pulse the core A is driven further into the saturation condition 0 so that the winding WA1 has a low impedance and the current passing through the winding WB1 assumes a value such that the critical value H$c$ of the field strength H is the core B is exceeded. Thus the initial condition is reached again and the cycle is repeated. Output pulses can be taken from auxiliary windings not shown on the cores A or B or from a resistor connected in series with the windings WA1 or WA2, for example, the resistor R2, or from terminals UA or UB.

The frequency divider shown in Fig. 4 contains three cores A, B and C, the cores A and B and their windings being identical to those of the circuit arrangement shown in Fig. 1. Here, however, windings WC1 and WC2 on the core C are connected in series with the windings WB1 and WB2, the number of turns of the windings WC1 and WC2, being equal to that of the windings WB1 and WB2 respectively. Windings on any further cores can be connected in series similarly.

In this embodiment, the positive and negative pulses are supplied by an alternating voltage generator GR through rectifiers G1 and G2. The junction of the windings WC2 and WB2 is connected, through a resistor R3, to a terminal of the generator GR.

This circuit arrangement operates as follows:

If the cores A, B and C at a certain instant are in the condition 0, the cores A and C pass to the condition 1 by the action of the first positive pulse which is supplied, through the rectifier G2, to the series-combination of the windings WC2, WB2 and WA2 and also, through the resistor R1, to the winding WA3. The core C changes its condition owing to the current passing through the winding WC2. During this change, the winding WC2 has a high impedance which limits the current, so that owing to the voltage division between the winding WC2 and the resistor R3 there is produced across the resistor R3 a comparatively low voltage only so that the current passing through the winding WB2 is too small to cause the core B to change its condition. The core A passes to the condition 1 owing to the pulse in the winding WA3. At the next subsequent negative pulse applied through the rectifier G1, the core A returns to the condition 0. The core C remains in the condition 1 because the comparatively high impedance of the winding WA1 limits the current passing through the winding WC1 to a low value. The next positive pulse causes the cores A and B to pass to the condition 1, the core A being influenced here also by the pulse through the winding WA3. Since the core C is already in the condition 1, this core is driven further into saturation by the positive pulse so that the winding WC2 has a low impedance. As a result a high voltage is produced across the resistor R3 so that the current passing through the winding WB2 increases to a value such that the critical field strength $Hc$ in the core B is exceeded. Since, when the core B changes its condition, the winding WB2 again has a high inductance, the current passing through the winding WA2 is limited so that this current counteracts the current flowing through the winding WA3 slightly only. The next negative pulse restores the core A again to the condition 0, the high impedance of the winding WA1 limiting the current passing through the windings WB1 and WC1 so that the cores B and C remain in the condition 1. At the subsequent positive pulse the cores remain in their respective conditions. The cores B and C are driven further into saturation by this pulse so that the windings WC2 and WB2 have a low impedance and the current passing through the winding WA2 effectively counteracts the current flowing through the winding WA3. By the next negative pulse the core A is driven further into the saturation condition 0 so that the winding WA1 has a low impedance and the current flowing through the windings WC1 and WB1 is increased to a value such that the cores B and C return to the condition 0. Thus the initial condition is restored and the cycle is repeated. Output pulses may be derived from auxiliary windings on the cores B and C (not shown) or from resistors connected in series with the windings WA1 or WA2. The output pulses can be supplied to a following frequency divider stage. The number of cores can be increased as required, $n$ cores generally providing a division ratio equal to $n$.

What is claimed is:

1. A magnetic frequency divider circuit comprising a first and a second core each composed of magnetic material having a rectangular hysteresis loop, first and second windings coupled to said first core, first and second windings coupled to said second core. said first windings being connected in series-aiding relationship, said second windings being connected in series opposition, a third winding on said first core, means for applying pulses of one polarity to said first windings in series, means for applying pulses of the opposite polarity simultaneously to said third winding and to said second windings, the pulses of one polarity alternating in time with the pulses of opposite polarity, the first winding on the first core having more turns than the first winding on the second core, the second winding on the first core having less turns than the second winding on the second core, said third winding having the same number of turns as the second winding on the first core and being wound in a direction opposite from said second winding.

2. A frequency divider circuit as set forth in claim 1, comprising at least one additional core, an additional first winding and an additional second winding coupled to said additional core, said additional first winding being connected in series with the first windings of said first and second cores, said additional second winding being connected in series with the second windings of said first and second cores, said additional first winding having the same number of turns as the first winding on the second core and being wound in the same direction, said additional second winding having the same number of turns as the second winding on the second core and being wound in the same direction.

References Cited in the file of this patent

UNITED STATES PATENTS

| | | |
|---|---|---|
| 2,695,993 | Haynes | Nov. 30, 1954 |
| 2,708,722 | An Wang | May 17, 1955 |
| 2,850,725 | Beaumont | Sept. 2, 1958 |
| 2,862,112 | Ringelman et al. | Nov. 25, 1958 |

OTHER REFERENCES

"Magnetic Amplifier Circuits and Applications," R. A. Ramey, "Electrical Engineering," September 1953, pp. 791–795.